United States Patent [19]
Kotorov et al.

[11] Patent Number: 6,118,432
[45] Date of Patent: Sep. 12, 2000

[54] BACKTYPE

[76] Inventors: Radoslav P. Kotorov, 205 W. Washington, Bowling Green, Ohio 43402; Leslie Johnson, 323 W. 43-rd St., New York City, N.Y. 10036

[21] Appl. No.: 09/015,275

[22] Filed: Jan. 29, 1998

Related U.S. Application Data

[60] Provisional application No. 60/036,819, Feb. 3, 1997, abandoned.

[51] Int. Cl.[7] .................................................. G09G 5/00
[52] U.S. Cl. ............................................. 345/168; 341/22
[58] Field of Search ....................... 341/22–23; 361/680; 345/168–169, 170–172

[56] References Cited

U.S. PATENT DOCUMENTS

| | | | |
|---|---|---|---|
| 5,144,302 | 9/1992 | Carter et al. | 341/23 |
| 5,612,691 | 3/1997 | Murman et al. | 341/22 |

*Primary Examiner*—Richard A. Hjerpe
*Assistant Examiner*—Ali Zamani

[57] ABSTRACT

The disclosure relates to a multifunctional (control, typing and editing) device for interactive computing, such as Web and Web TV computing. It consists of a frame, two removable letter keypads, and different sizes of hand extensions that can be attached to the sides of the frame. The frame consists of two rectangles of different sizes that are permanently attached to one another. The lower rectangle is narrower and thinner than the upper rectangle. On the upper, wider and thicker, rectangle are permanently positioned some function and control keys to be accessed primarily by the thumbs. The lower rectangle contains two square compartments into which can be placed the removable letter keypads. The keypads contain active keys on one side and the images of the active keys on the other side. Depending on how the keypads are positioned into the compartments the active keys can be accessed either from the front or from the back of the device, thus allowing for two completely different ways of typing.

7 Claims, 8 Drawing Sheets

BACKTYPE

This patent application is based on provisional patent application Ser. No. 60/036,819 filed on Feb. 3, 1997, now abandoned.

FIELD OF THE INVENTION

The present invention relates to control, typing and editing devices for use with a computer or Web TV specifically, but not limited to surfing the net or to performing interactive computing. It also partially relates to the ergonomically designed keyboards for maximum comfort and efficiency.

BACKGROUND OF THE INVENTION

There are a large variety of specialized and ergonomic keyboards. The specialized keyboards try to make specific data entry easier by either reducing the number of keys or by re-arranging the keys with respect to the particular purpose. An example of such a keyboard is the numeric pad for accountants, which contains only numbers and operator keys. Ergonomic keyboards, on the other hand, try to solve the problem of the position of the hands and the body when using a computer, which is not natural and thus often causes serious body damage. Both types of keyboards offer solutions for particular problems that pertain to data entry and editing. However, they do not address the issues related to interactive computing, which is partially due to the fact that the Internet and the World Wide Web (WWW) have become more widely used recently. The conception of the present invention is entirely driven by the increasing use of the WWW and the need for a functionally different type of device for it. In contrast, the development of specialized and ergonomical keyboards is largely driven by the advent of desktop and laptop computers, and the efficiency or health problems associated with their extensive use. We believe that interactive computing has changed the dynamics of the computer activities. Even though most of the events in interactive computing are user driven, the user is not only active but also reactive and responsive to screen events. This requires the development of adequate devices that facilitate the two-way interaction between the user and the machine.

Since desktop computing is used primarily for data entry and editing many routine operations can be performed habitually, i.e. without looking either at the screen or at the keyboard. Unlike desktop computing, in interactive computing the user has to pay attention to the events that are going on the screen and at the same time to have control of the imputing device. This requires the imputing device for interactive computing not only to be multifunctional but also to be positioned in the same visual plane as the screen. The device needs to be multifunctional for it has to combine the features of a remote control for managing the activities on the screen, and the features of regular data entry and editing keyboards for imputing data.

With the advent of interactive computing the position of the user relative to the screen has changed too because, first, computer monitors have become bigger and, second, because Web TV allows ordinary TV sets to be used for interactive computing. Thus, the distance between the user and the monitoring device becomes less significant, which allows the user to perform interactive computing from almost any body position provided that a suitable control and imputing device is available to the user. In contrast, traditional computing restricts the body position of the user to sitting on a desk at a close proximity to the computer screen in order to be able to see the input on the screen, and because the keyboard has to lay on a flat surface.

Even though the body position becomes less significant in interactive computing, it becomes more important for the user to be able to view simultaneously the screen and the multifunctional device, which implies that both the screen and the multifunctional device have to be in the same visual plane. This effect is achieved only when the user is able to hold the control and imputing device in the hands, in front of the eyes and at the same level with the screen. When a device is held in such position the only way in which typing and editing can be performed is by positioning some of the keys at the back of the device. When the present invention is in a back-type position the user is able to lift it up and hold it at the same level as the screen, and thus simultaneously to control the screen activities and to input data. The visibility of the device is essential because very few of the tasks in interactive computing are routine, as well as few of the users are professional typists who can input data without looking at the keys. However, it is important not to limit the user to back-type typing either because the user may be more accustomed to traditional typing and thus may prefer to perform certain tasks this way, and, second, because the user may want to change his body position to sitting at a desk. The removable keypads allow the user to switch back and forth between the more novel interactive mode of screen control and data imputing and the traditional data entry method.

It needs to be emphasized that interactive computing has attracted a great variety of users. While traditional computing has been used by the adult population primarily for professional purposes, interactive computing has attracted and is continuing to attract more and more young users because of its entertaining and educational capabilities. Thus, the new devices for such type of computing have to make accommodations for the different hand sizes, if the device is to be used both by children and adults. This concern motivated us to introduce hand extensions in the present invention.

BRIEF DESCRIPTION OF THE PRIOR ART

The majority of the keyboards in the prior art is ergonomical and is designed to reduce the bodily stress associated with repetitive motions and with the unnatural body position. Even though the main objective of the present invention is to provide an adequate design for interactive computing device we believe that the invention also has some ergonomically beneficial features that distinguish it even further from the prior art. The emphasis in the prior art is entirely on improving the layout so that the hands can be repositioned and the body can assume a more relaxed posture. All approaches to making keyboards more ergonomical emphasize on three aspects: first, utilizing more the thumb, which is the strongest finger and the most underutilized one in traditional keyboards; second, improving the position of the wrists; third, accommodating different hand sizes. Despite the differences in the design and the arrangement of the keys most of the existing keyboards require the operator's forearms to be positioned at inwardly directed angles from the operator's sides toward the keyboard, with the palms down and the hands generally flat. The wrists are bent and the hands are angled outwardly relative to the forearms in order to align the operator's fingers with the keys. When the hands are placed in a different position, i.e. when the palms face one another, the entire bodily position is improved but the visibility of the keys is sacrificed which makes such keyboards difficult to use. The innovative design of the present invention resolves the problems pertinent to the approaches taken in the prior art.

Many attempts are made to reposition the keys or the wrists in a way that allows more keys to be accessible by the thumbs. Despite the fact that the thumbs are the strongest fingers, when the hands are in a lay down position the thumbs are less versatile and thus remain underutilized. The strength of the thumbs is fully exercised when it presses against the rest of the fingers, i.e. when the hand is in a grip position. That the versatility and the strength of the thumb are greatly improved when the hand is in a grip position is apparent from the vast use of hand held remote control devices for TVs, VCRs, etc. As it is evident from the cited patents below none of them takes this approach. The conventional approaches try to increase the use of the thumb by either putting editing keys in between the letter keys or by putting them underneath the letter keys. However, without radically changing the position of the hand the thumb cannot be fully utilized.

U.S. Pat. No. 4,974,183 to Wendell E. Miller presents a specialized editing keyboard with thumb-actuated edit keys in which he tries to make more use of the thumbs.

To accomplish this the thumb accessible keys are arranged in a square and are located below the letter keys. Even though this approach increases the versatility of the thumbs it does not present a radically different solution from the traditional keyboards where the editing keys are placed in the last row of keys. The increased versatility of the thumbs results from increasing the inward bend of the wrists, which allows the thumbs to access more keys positioned underneath the letter keys. Our solution is radically different, for we replicate the frequently used editing keys and place the replicated set above the letter keys. Thus, when the device is used in a back-type position and the hand is in a grip position the thumbs access the upper row of frequently used editing keys.

A different approach to solving the problems related to the more efficient use of the fingers is given in U.S. Pat. No. 4,906,117 to Gerry G. Birdwell. The inventor describes a reconfigurable keyboard, where the keys can be moved from one position to another, and a specialized software is used to re-map the keys. Even though this increases the flexibility of the fingers it does not improve substantially the position of the wrist. To improve the overall state of the user both the positions of the fingers and the wrists have to be changed, as it is in the present invention. By rotating the keypads both the positions of the wrists and of the fingers change.

The desire to change the position of the wrists comes from the severe injuries resulting from repetitive motions and from keeping the body in the same position for long periods of time. It is a common knowledge that an improved position of the wrists leads also to improved body position. A common approach used in the prior art is to separate the keyboards into two parts. Some inventors have increased the distance in between the keys accessible by the left and the right hand. By keeping the wrists at a longer distance from one another the position of the shoulders is improved too. However, the stress on the fingers and the wrists remains the same because their position has not changed. Another underestimated inconvenience of the divided type of ergonomical keyboards is that they reduce the visibility of the keys. When the distance in between the two halves is increased, the surface of the visual plane is also increased and the user is not any more able to look at the keys on the left and the right side without turning the head. This slows the typing of those individuals who need to look more often at the keys. In general, the method relies on the habitual skills of the typists, i.e. that they do not need to look at the keys. However, Web users not only perform less routine movements because of the nature of interactive computing, but also are less experienced and thus need more visibility of the keys. In interactive computing it is very important for the user to have hands/fingers/eyes/mind coordination, as opposed to the traditional keyboards where the user needs just hand/fingers/mind coordination A more radical approach not only separates the keys accessible by the left and the right hand but also rotates the pads on various degrees in order to reposition the wrists. In this case the user's hands are placed in an anatomically neutral position with the palms facing each other. In U.S. Pat. No. 5,137,384 to Jeffery B. Spencer and Stephen L. Albert and U.S. Pat. No. 5,160,919 to Jack M. Mohler and Jacque L. Havice are presented split keyboards in which the keys are spaced into vertically arranged keypad halves. This solution avoids the wrist twisting of the user's hands, which occurs in traditional keyboards. However, the keys fall out of the user's vision for which the user is provided with visual-reference mirrors, adjustable to the eyes. Even though this approach solves the problem of the wrist it creates different types of tension because the reference mirrors are positioned at different sides which necessitates more frequent movements of the head and the eyes. We believe that if a keyboard is going to be independent of the body position then not only the stress in the hands and the fingers has to be removed, but all types of bodily tensions due to unnatural position or movements of any organs have to be eliminated. In addition, because of the complicated construction needed to support the pads and the reference mirrors these keyboards can be used only for desktop computing.

U.S. Pat. No. 5,410,333 to Kevin M. Conway comes closer to the present invention. The inventor has recognized the fact that the most ergonomical position for typing is when the device is held like a book. Thus, he positions the letter keys on the cover of a book-like device allowing the user to access the letter keys from the back of the device. However, the inventor relies heavily on the habitual skills of experienced typists for he does not provide visual references to the letter keys. This is evidenced by the fact that he positions keys on both sides of the device with the letter keys being at the back and the function keys being in the front and over the letter keys. The inventor explicitly states that to identify the invisible keys more easily they have to be "differentiated by texture, contour, shape, or other features." It is not his intent to make the latter keys visible to the typists. In addition to this, the positioning of the thumb accessible keys over the letter keys reduces their versatility for to access the keys the thumbs have to bend inward towards the middle of the palm. As it is obvious from the existing remote control devices the thumb is most strong and versatile when it presses slightly above the fingers when the hand is in a grip position. Because the thumb accessible keys of the invention in U.S. Pat. No. 5,410,333 are positioned exactly over the letter keys the user's hands cannot be in a grip position for the versatility of the thumbs will be reduced to zero. Consequently, the user cannot hold the device in a stable way for which the inventor provides additional supporting mechanisms for the device. In the present invention the thumb accessible keys are positioned on the upper frame, which is wider and elevated above the rest of the frame, in order to provide more comfortable access to the keys by the thumbs, as well as to preserve the visibility of the letter keys when the device is used in back-type position, and in order for the user's hands to hold the device in a grip position.

We believe that many of the inventions in the prior art that are similar to the inventions in U.S. Pat. Nos. 5,137,384, 5,160,919 and 5,410,333 never received commercial acceptance primarily because of the lack of full visibility of the letter keys and because they did not offer flexible body positions.

Several inventors attempt to resolve the typing problems associated with the differences in hand sizes. One of the proposed solutions is to use elongated keys as it is in U.S. Pat. No. 5,017,030 to Jay A. Crews. This solution is of the type "one size fits all" and even though it works well for large hands, it puts at disadvantage people with smaller hands for the wrists have to travel a longer distance to reach the keys. Another solution that recognizes the distance problem is to vary the size of the keyboard itself, and is presented in U.S. Pat. No. 5,531,529 to Dennis W. Nusser. The solution is motivated by the recognition that at different ages children's hands are in different proportion to the adult hand. As it is evident neither of the two solutions proposes the use of hand extensions. This is so for no existing keyboard is used when the hands are in a grip position. When the hands are in a grip position then extensions are effective for they increase the distance between the palm and the keys, making it possible for just the finger tips to be comfortably positioned over the keys when the keyboard is in a back-type position.

Thus, it appears that the present invention has a number of novel features, which are not disclosed in the prior art. These novel features are the result of the new functional requirements, which also lead to some ergonomical improvements.

SUMMARY OF THE INVENTION

The primary object of the present invention is to provide a control device for interactive computing which combines editing capabilities and screen control capabilities. In this sense, the device has some of the functions of traditional keyboards and of remote control devices for TV and VCRs, which is reflected in the innovative design of the frame. It is also the object of the present invention to provide an easy to learn editing device that can be used by the many experienced and inexperienced Web users for entertainment, for long distance learning or simply for doing office work through the Internet. Thus, it is essential to preserve the QWERTY layout, with which many users are familiar, and at same time to provide the users with the ability to change the method of typing by rotating the removable keypads. It is also the object of the present invention to provide users with a position free device so that the body is not confined to any particular position for a long time, which always creates unnecessary stress to some organs. That the user can switch between normal-type and back-type makes the present invention completely position free for the device can either be placed on a horizontal surface and used as a regular keyboard, or it can be hand-held and operated similarly to a remote control. Finally, it is the object of the present invention for the device to be equally appealing to all age groups, as well as to users with different hand sizes, for which hand extensions are provided.

In accordance with the objects of the present invention the device is multifunctional, i.e. it provides control, typing and editing capabilities, and thus allows the operator both to have control over the activities on the screen, i.e. to scroll through different pages and images, and to provide input, i.e. to type in information. It consists of a frame on which there are permanently positioned the function, the editing and the control keys, as well as the two compartments that hold the removable letter keypads. The letter keypads have active keys on the one side and images of the active keys on the other side. When the keypads are placed in the compartments so that the user faces the active keys the device is in a normal-type position and is used more or less like a regular typing and editing device or keyboard. The letter keypads can be taken out of the compartments, turned over, rotated on 90 degrees and re-positioned back into the compartments with the images of the active keys facing the user. In this case the device is in a back-type position and is operated by holding the frame and typing at the back of it. This position is particularly convenient for interactive computing where the user has to have the screen and the control and inputting device in the same visual plane. The active letter keys have rectangular elongated form and are positioned in the removable square keypads. The elongated form of the letter keys is determined by the need to position three rows and five columns of keys into square-shaped pads in order for the user to be able to rotate the letter keypads. The upper part of the frame, where most of the function, editing and control keys are positioned, is wider and thicker than the lower part of the frame. This makes it easier for the thumbs to access the function and control keys and also allows the frame to rest in between the thumbs and the index fingers when it is held in a back-type position. Along the narrower side of the frame can be positioned different hand extensions to accommodate different hand sizes.

DESCRIPTION OF THE PREFERRED EMBODIMENTS

Figure 1:
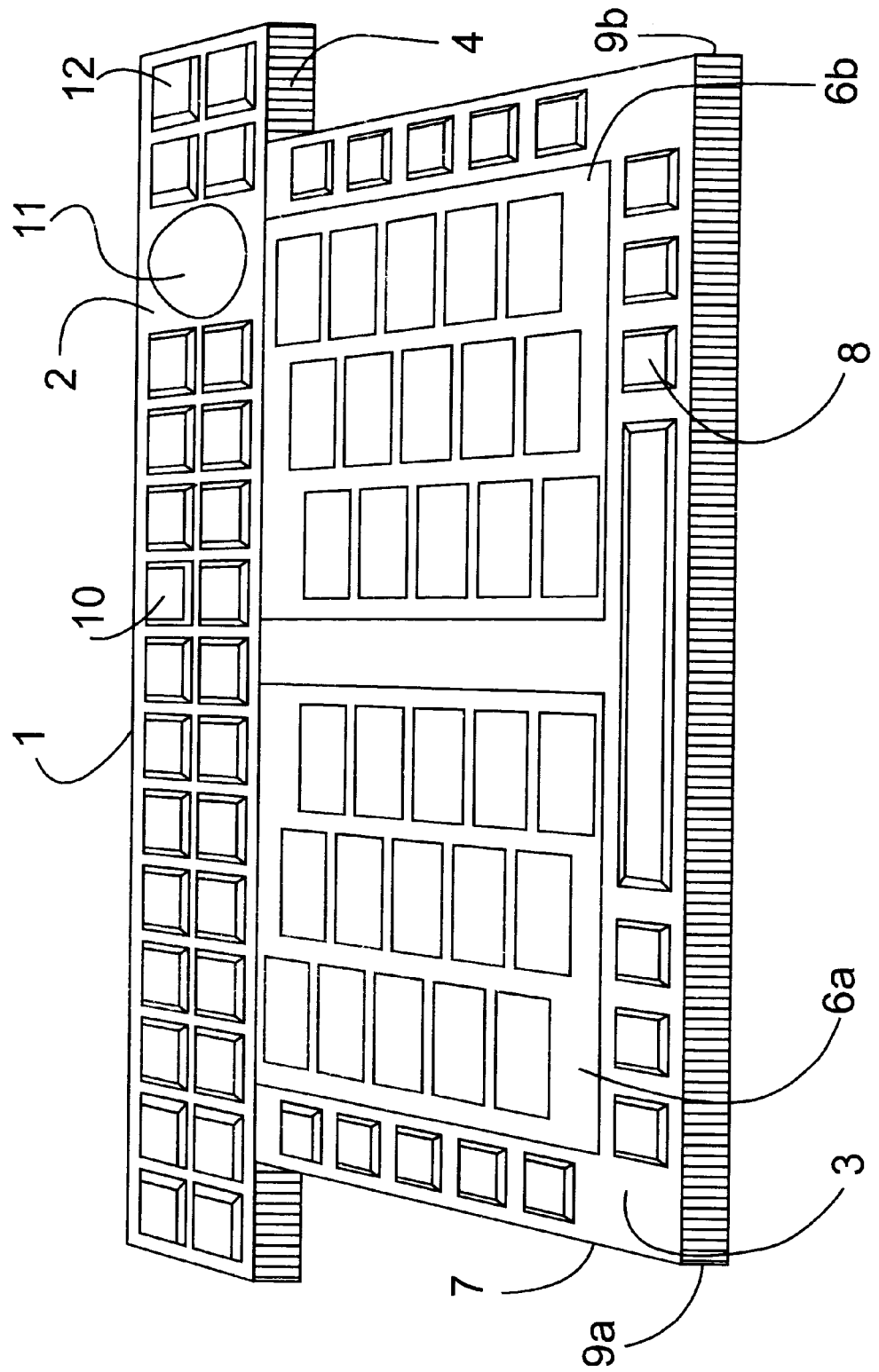
FIG. 1 is a view from above of the whole frame with the removable letter keypads positioned in the two compartments in the lower and narrower rectangle of the frame.

The first embodiment of the invention is shown in FIG. 1. The device includes a frame 1, which consists of two permanently attached to one another rectangles (2 and 3) that have different sizes. The upper rectangle 2 is wider and higher that the lower rectangle 3. The lower rectangle contains two compartments into which the removable letter keypads (6a and 6b) are positioned. At the bottom of the lower rectangle are permanently positioned a plurality of function and editing keys 8. The keys 8 resemble very much the keys in the last row of traditional keyboards, which makes it easier for the user to operate the device in a normal-type position. When the device is used in a back-type position the user holds it along sides 7 of the lower rectangle 3, with the palms firmly pressing upon sides 7. In this way the hand is in a grip position and the fingers have enough versatility to press the keys, for the device is supported by the palms. If the device is held, as it would be if the fingers support the device, i.e. when the thumbs press against the rest of the fingers, then the versatility of the fingers will be reduced to zero. Along sides 7 can be positioned the hand extensions, by sliding them in from the edges 9a and 9b. On the upper rectangle 2 are permanently positioned a plurality of function, editing and numeric keys 10, as well as a trackball 11. The upper rectangle 2 extends to the left and the right of the lower rectangle 3. The extended parts 4 of the upper rectangle 2 serve dual purpose. First, more columns of keys 12 can be positioned on the extended parts 4. When the hand is in a grip position the thumbs can move outwards without loosing any of their versatility. Consequently, by positioning keys above and outward of the palm the number of easily accessible keys by the thumbs is increased. Second, the extended parts 4 of the upper rectangle 2 may serve to rest the frame 1 in between the thumbs and the rest of the fingers, thus allowing the palms to rest without loosing control of the device. The upper rectangle 2 is also elevated (see 5) above the lower rectangle 3. By elevating the upper rectangle the distance between the keys on it and the thumbs is reduced when the device is in a back-type position. If the entire frame has the same height the thumbs will fall perpendicularly over the keys, which will increase their bent and thus create unnecessary stress.

Figure 2:
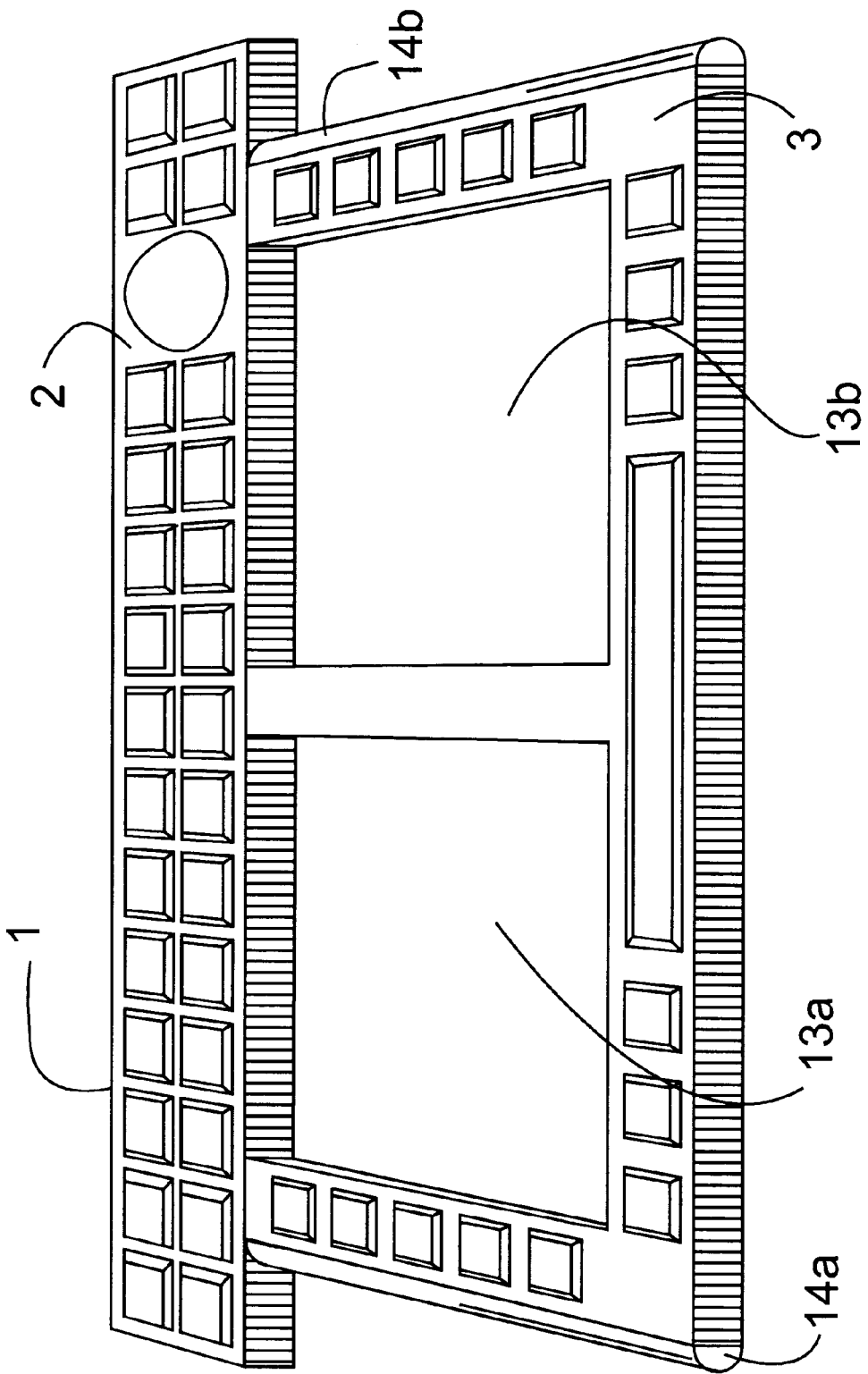
FIG. 2 is a view from above of the frame with hand extensions positioned along the sides of the lower and narrower rectangle of the frame, and with the letter keypads being removed from the compartments.

FIG. 2 represents the frame 1 with the compartments (13a and 13b) for the letter keypads, and with two hand extensions 14a and 14b. When the letter keypads are not installed into compartments 13a and 13b the device can be operated only as a remote control, for the user can access only the function and control keys on the upper rectangle 2. The compartments 13a and 13b have square shapes, which allows the letter keypads to be rotated when the user decides to change from normal to back-type position and vice versa. The hand extensions 14a and 14b increase the width of the lower rectangle 3. Thus, they increase the distance between the palm and the frame, which allows the longer fingers of larger hands to fall comfortably over the letter keys when the device is held in a back-type position.

Figure 4:
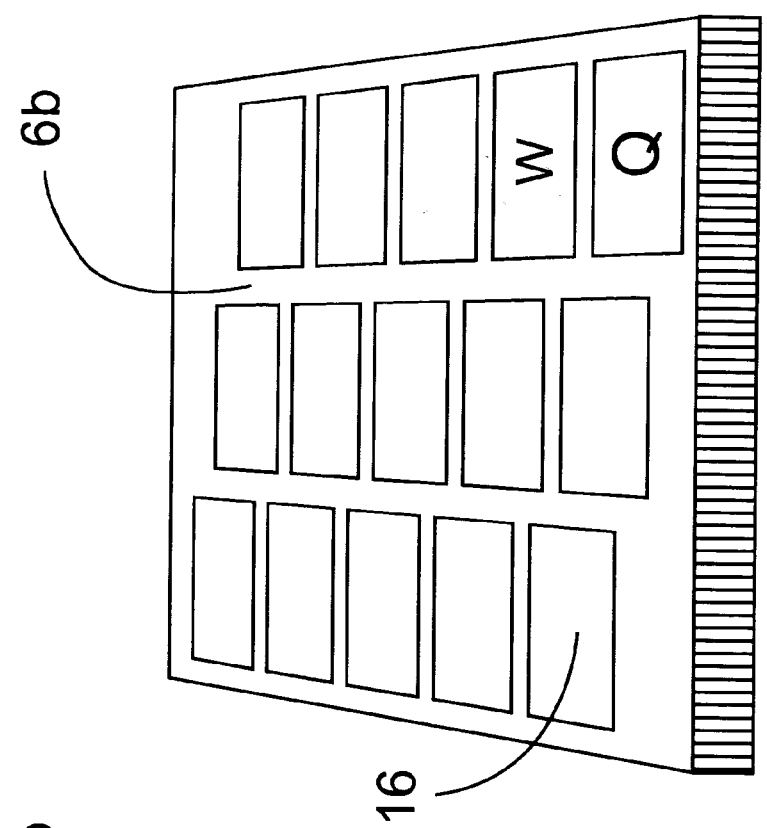
FIG. 4 is a view from above of the device in FIG. 3 when it is just turned over and the images of the active keys become visible.
Figure 3:
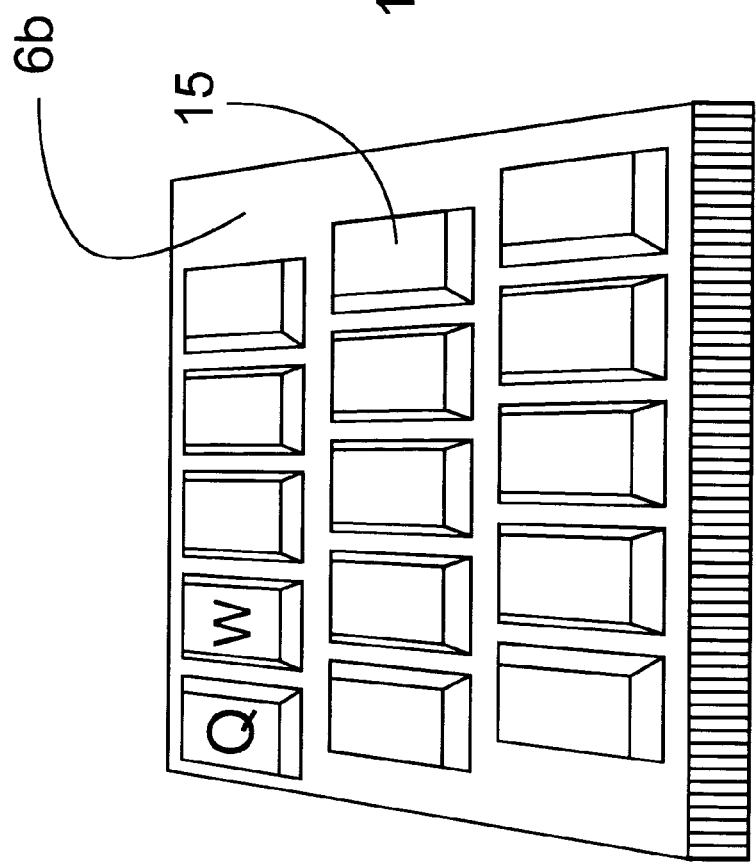
FIG. 3 is a view from above of the left removable letter keypad, with the active keys being visible.

On FIG. 3 is given the left removable letter keypad 6b with the active keys 15 being visible. The left and the right letter keypads have identical square shapes, with only the letters being different. The keys 15 are vertically elongated for two reasons. First, the elongate form allows five columns and three rows of keys to fit into the square pad. Second, when the device is in a back-type position the finger tips access more comfortably the keys for the keys have the same shape as the finger tips. On FIG. 4 is given the left removable letter keypad 6b from FIG. 3, but when it is turned over and when the images 16 of the active keys are visible.

Figure 5:
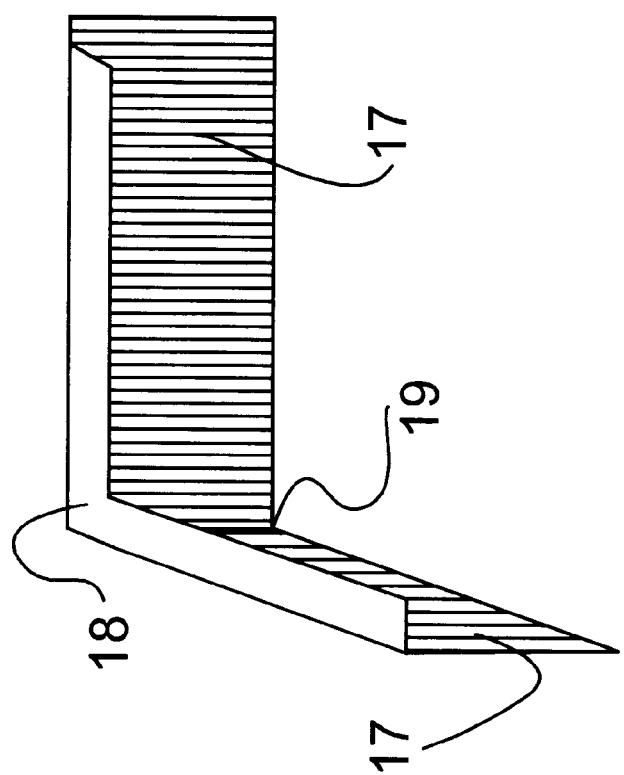
FIG. 5 is a view from above of the left upper corner of one of the compartments that are positioned in the lower and narrower rectangle of the frame.

FIG. 5 represents a detailed view from the above of the upper left corner 19 and the adjacent walls 17 of one of the compartments for the removable letter keypads. The removable letter keypads slide in the compartments from the back of the device. They are removed by pushing them out of the compartments from the front side of the device. There is a narrow edge 18 that extends inward from the walls of the front side of the compartments in order to prevent the letter keypads from coming out of the compartments when they are placed in the compartments.

Figure 6:
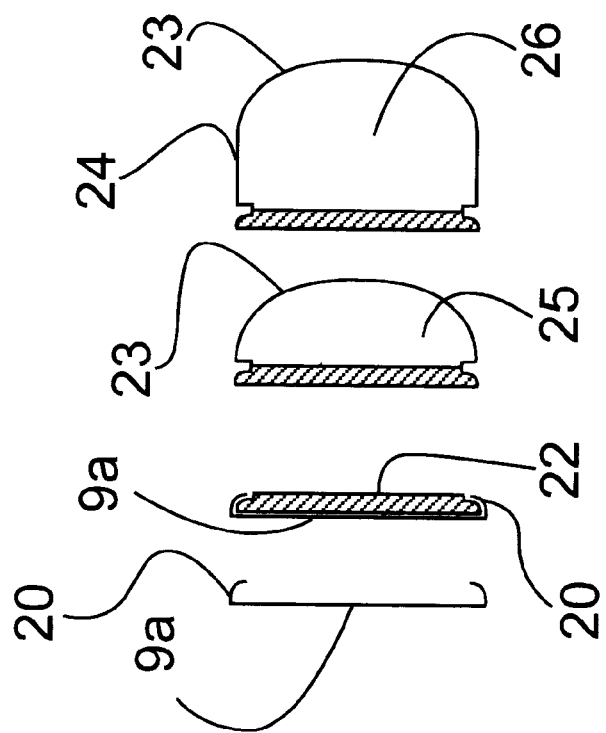
FIG. 6 is front view of the front edge of the right side of the lower rectangle of the frame along which the hand extensions can be positioned. To the left of it are three different sizes of hand extensions.
Figure 9:
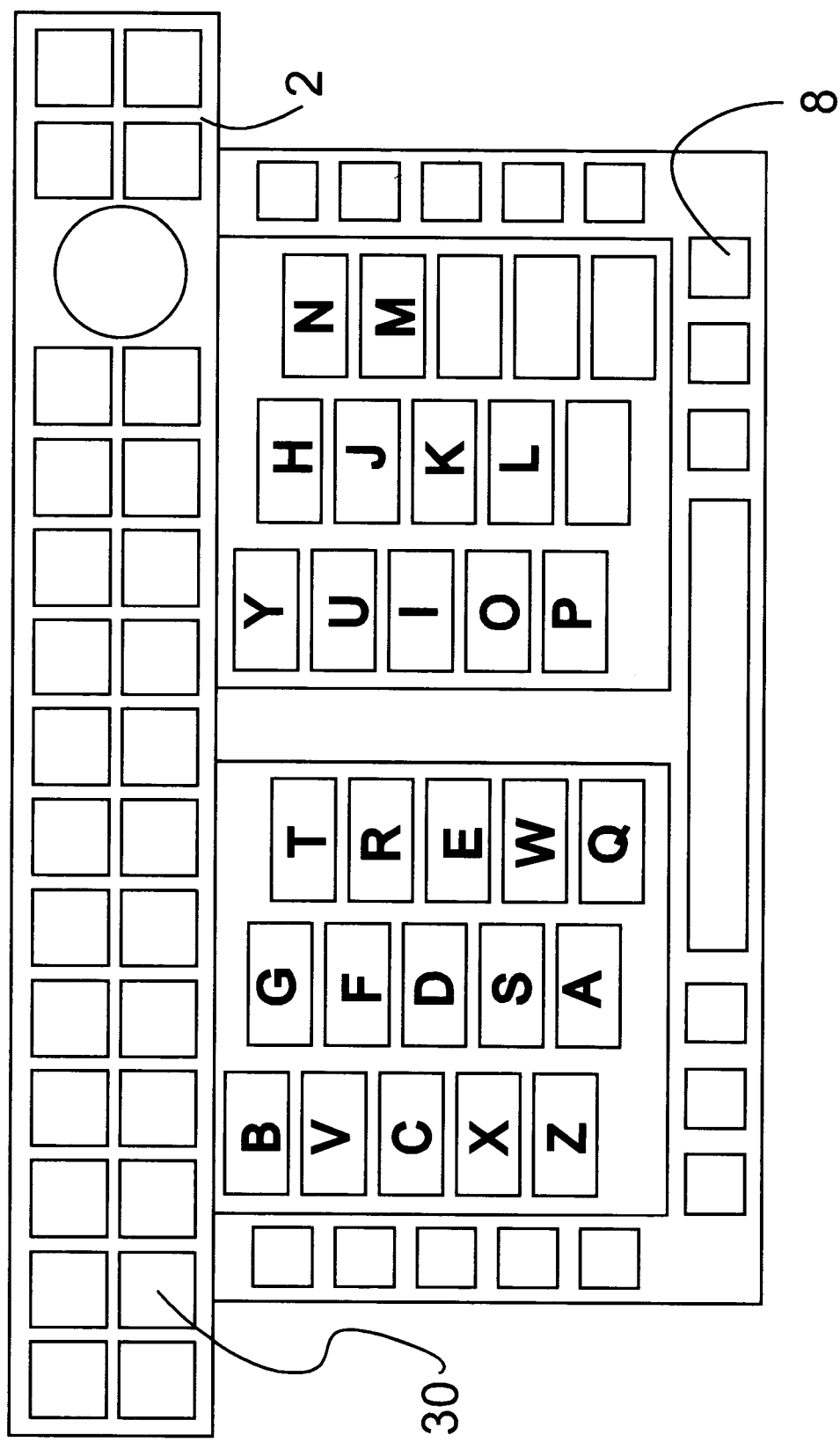
FIG. 9 is a top view of the device with the removable keypads positioned with the images of the active keys facing the user, i.e. when the device is in a back-type position.

On FIGS. 6, 9a is a front view of the right edge of the lower rectangle of the frame of the device. Along the outer side adjacent to the edge 9a (see 7 on FIG. 1) can be positioned the hand extensions. The hand extensions slide along the wall adjacent to the edge 9a and the extensions holders 20, which keep them firmly attached to the frame. All sizes of hand extensions have an edge 21, which fits right underneath the extension holders 20. 22 is not a hand extension in the real sense of the word, for it only closes the distance between the extension holders 20 and the wall, when the user does not need extensions. 22 is used to smooth the edges on the side walls formed by the extension holders 20 when the user holds the device in a back-type position. 25 is a real hand extension in which the oval shape of the outer wall 23 increases the distance between the palm and the letter keys when the device is held in a back-type position. In this way larger hands with longer fingers can comfortably use the same device. Extension 26 accommodates larger hands than extension 25. It also has an oval outer wall 23, but in addition to that the distance between the inner and the outer wall is further increased, as is evident from the additional extension 24.

Figure 7:
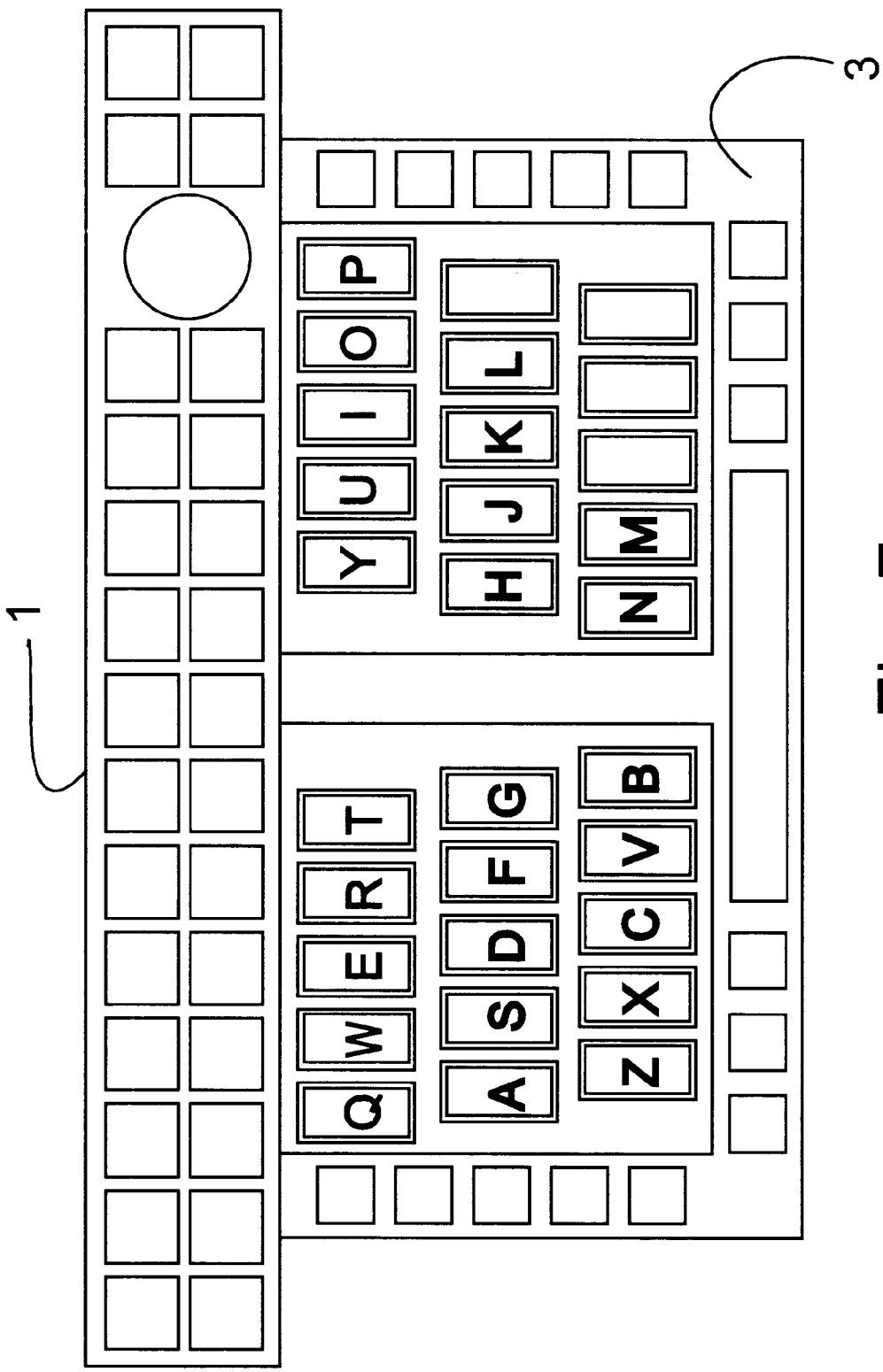
FIG. 7 is a top view of the device with the removable letter keypads positioned with the active keys facing the user, i.e. when the device is in a normal-type position.

FIG. 7 is a top view of the frame 1 when the removable letter keypads are positioned with the active keys facing the user. The device is in a normal-type position and can be operated in a similar way as the traditional keyboards, i.e. it has to be placed on a flat surface. The space bar at the bottom of the lower rectangle 2 is active on both sides. When the device is operated in a normal-type position, placing the space bar underneath the letter keys makes the arrangement of the keys on the present device similar to the arrangement of the keys in regular QWERTY keyboards, which is familiar to many users and in which some editing keys and the space bar are positioned in the last row of keys. On the other hand, when the device is operated in a back-type position it is convenient for the user to access the spacebar at the bottom of the frame with the pinkies.

Figure 8:
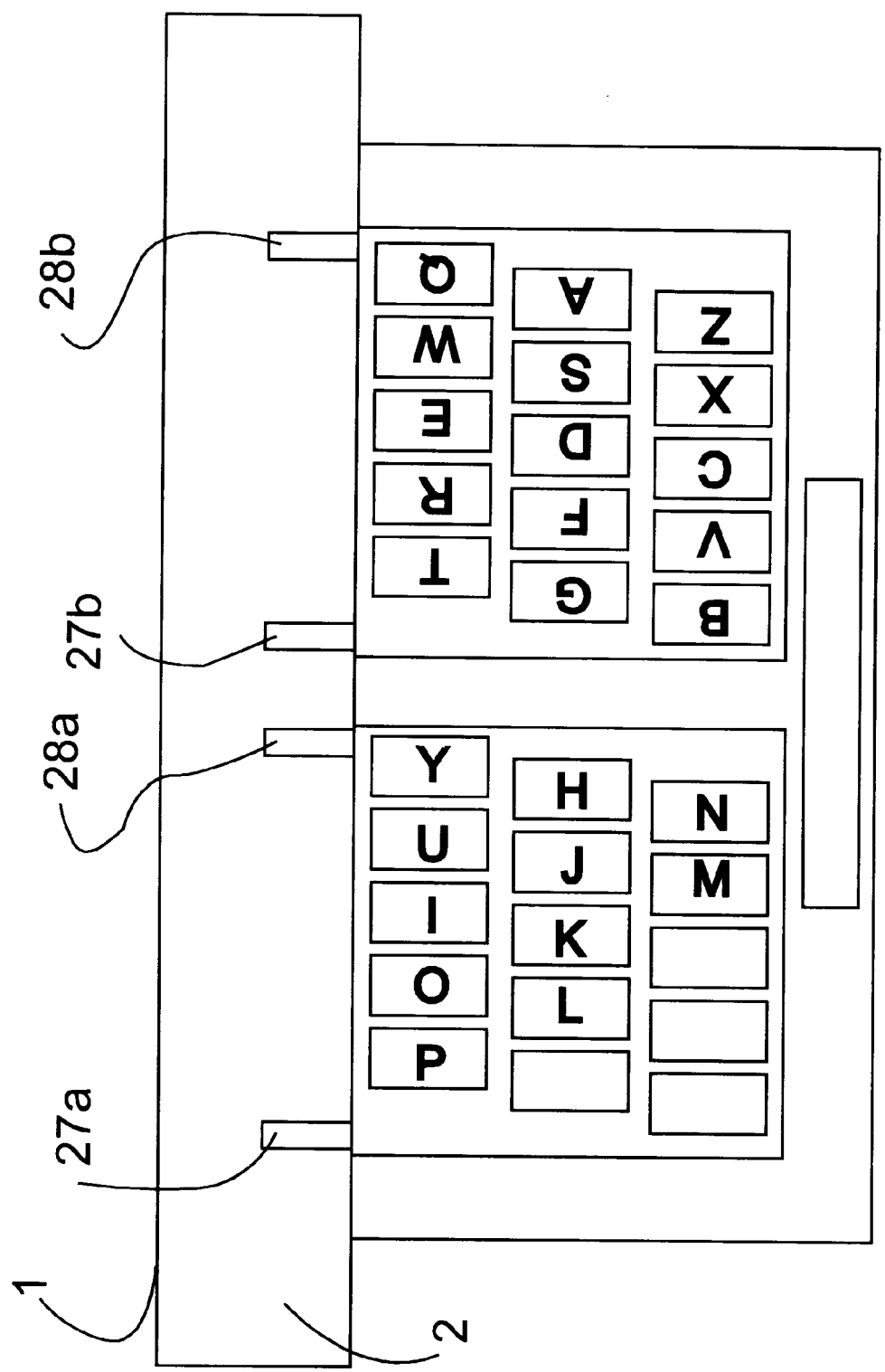
FIG. 8 is a top view of the back of the device when it is in normal-type position.
Figure 10:
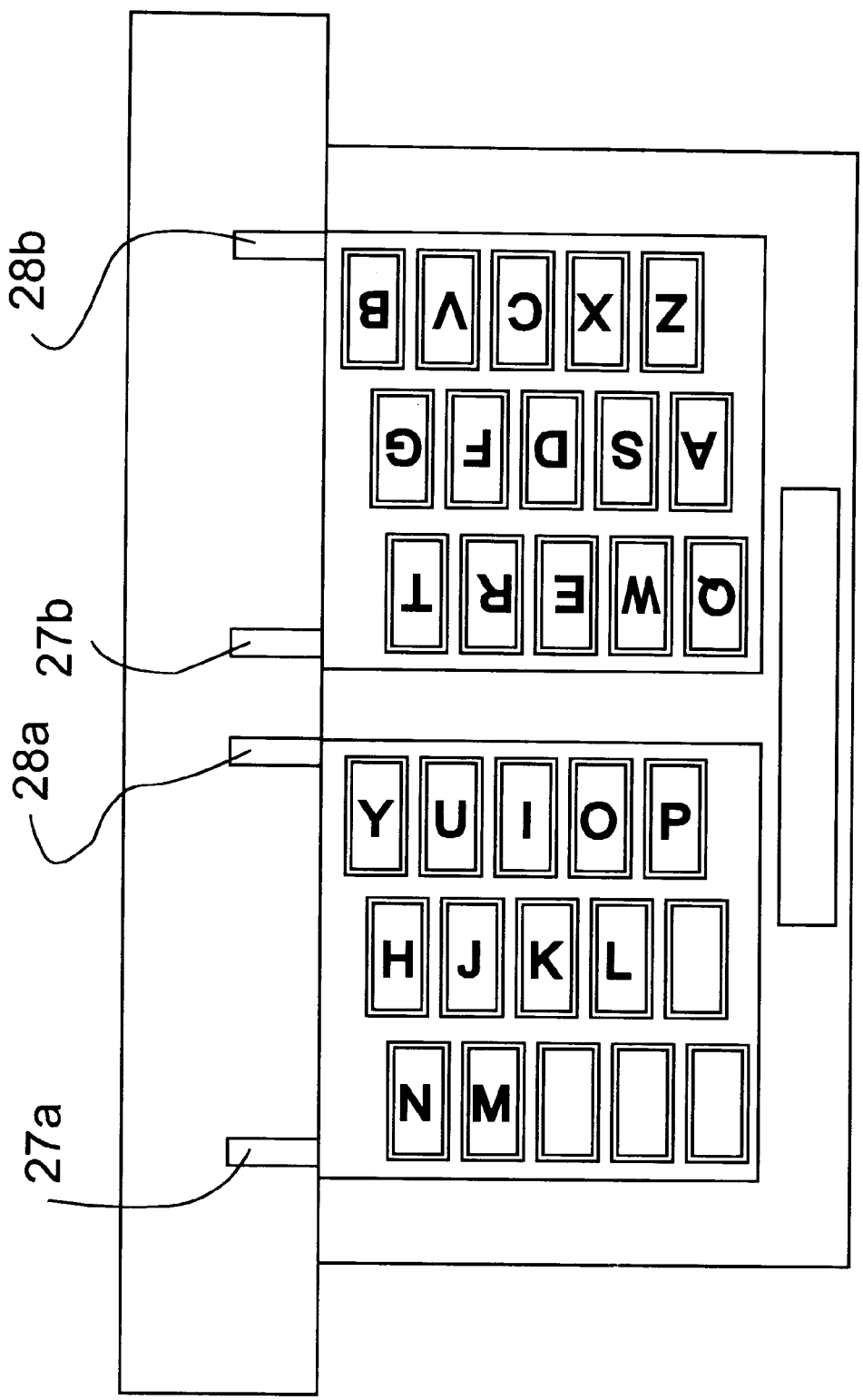
FIG. 10 is a top view of the back of the device when it is in back-type position.

FIG. 8 is a view of the back of the device when it is in normal-type position. There are four latches 27a, 27b, 28a and 28b placed at the back of the upper rectangle 2 of the frame 1. The purpose of these latches is to secure the removable letter keypads 6a and 6b after they are positioned in the compartments. Latches 27a and 27b secure the removable letter keypads when the device is in a normal type position. Latches 28a and 28b secure the letter keypads when the device is in a back-type position as can be see in FIG. 10. The necessity of four latches is determined by the fact that when the removable letter keypads are turned over and rotated, the empty surface at the corner of the removable letter keypad changes its position relative to the latches. The rotations of the removable keypads is necessary so that the position of the fingers relative to the latter keys can remain the same both in normal-type and in back-type positions of the device. This is evident from FIG. 9, which is a top view of the front of the device when it is in back-type position. The editing keys 8, familiar from the traditional keyboards, are replicated as additional set of keys 30 on the upper rectangle 2 of the frame 1. This is necessary because when the device is operated in a back-type position the keys 30 are more easily accessible by the thumbs.

The device does not need to be connected to a terminal or other electronic device. An infrared connection device can be easily positioned on the upper side of the upper rectangle of the frame.

Though the invention has been described with respect to specific preferred embodiments thereof many variations and modifications will immediately become apparent to those skilled in the art. It is therefore the intention that the appended claims be interpreted as broadly as possible in view of the prior art to include all such variations and modifications.

What is claimed is:

1. A keyboard comprising:

a first rectangular frame and a second rectangular frame, said first rectangular frame comprising active functional keys, numeric keys and a trackball on a front side, said second rectangular frame comprising two square receiving slots for receiving first and second square removable character keypads, said first and second square removable character keypads having active elongated character keys on one side and a key map on an opposite side indicating the position of each active elongated character key for that keypad on the opposite side of that keypad, wherein both keypads are removable from the second frame such that the active keys are provided on the front side of the keypad for a normal-typing mode and the key maps are provided on the front side of the keyboard for back-typing mode.

2. A keyboard as recited in claim 1, wherein the first rectangular frame extends to the left and to the right of said second rectangular frame.

3. A keyboard as recited in claim 1, wherein the removable keypads are removed from the second frame, the keypads are turned over, the keypads are rotated 90 degrees, and then the keypads are returned to the second frame to convert from one of said normal-typing mode and said back-typing mode to the other of said normal-typing mode and said back-typing mode.

4. A keyboard as recited in claim 1, further comprising hand extensions which are attachable to the left and right sides of said second frame.

5. A keyboard comprising:

a first rectangular frame and a second rectangular frame, said first rectangular frame comprising active functional keys, numeric keys and a trackball on a front side, said second rectangular frame comprising active character keys on the back side and a key map on the front side indicating the position of each active character key on the front side of the keyboard for a back-typing mode.

6. A keyboard as recited in claim 5, wherein the first rectangular frame extends to the left and to the right of said second rectangular frame.

7. A keyboard as recited in claim 5, further comprising hand extensions which are attachable to the left and right sides of said second frame.

* * * * *